United States Patent [19]

Thoma et al.

[11] Patent Number: 4,675,211

[45] Date of Patent: Jun. 23, 1987

[54] PROCESS FOR MULTIPLE-COAT REVERSE COATING USING POLYURETHANE SOLUTIONS

[75] Inventors: Wilhelm Thoma, Leverkusen; Josef Pedain, Cologne; Walter Schröer, Leverkusen, all of Fed. Rep. of Germany

[73] Assignee: Bayer Aktiengesellschaft, Leverkusen, Fed. Rep. of Germany

[21] Appl. No.: 599,112

[22] Filed: Apr. 11, 1984

[30] Foreign Application Priority Data

Apr. 13, 1983 [DE] Fed. Rep. of Germany ....... 3313239

[51] Int. Cl.$^4$ .............................................. B05D 5/10
[52] U.S. Cl. ................................................... 427/208.8
[58] Field of Search ...................................... 427/208.8

[56] References Cited

U.S. PATENT DOCUMENTS 4,116,741  9/1978  Thoma ................................. 156/239
4,248,910  2/1981  Pedain ............................... 427/208.4

FOREIGN PATENT DOCUMENTS 2455318  12/1976  Fed. Rep. of Germany .

Primary Examiner—Bernard D. Pianalto
Attorney, Agent, or Firm—Gene Harsh; Joseph C. Gil; Thomas W. Roy

[57] ABSTRACT

This invention relates to a process for multiple-coat reverse coating using at least two different polyurethane coating solutions, all the coating solutions containing one and the same polar solvent, preferably substantially anhydrous dimethyl formamide. By choosing (A) surface-coat polyurethane solutions specially made up using high-melting diol chain-extending agents and by using (B) highly concentrated adhesive-coat polyurethane solutions containing at least 40% by weight of polyurethane, it is possible to effectively prevent the so-called "frost-work effect" when applying the adhesive coat to the surface coat (A) by the reverse coating process and the troublesome "overlamination" off the web-form textile during its lamination onto the PU-layers formed by reverse coating. In addition, recovery of the solvent from the coating solutions is simplified.

15 Claims, No Drawings

PROCESS FOR MULTIPLE-COAT REVERSE COATING USING POLYURETHANE SOLUTIONS

BACKGROUND OF THE INVENTION

1. Field of the Invention

This invention relates to a process for multiple-coat reverse coating using at least two different polyurethane coating solutions, all the coating solutions containing one and the same polar solvent, preferably substantially anhydrous dimethyl formamide. By choosing (A) surface-coat polyurethane solutions specially made up using high-melting diol chain-extending agents and by using
(B) highly concentrated adhesive-coat polyurethane solutions containing at least 40% by weight of polyurethane,
it is possible to effectively prevent the so-called "frostwork effect" when applying the adhesive coat to the surface coat (A) by the reverse coating process and the troublesome "overlamination" of the web-form textile during its lamination onto the PU-layers formed by reverse coating. In addition, recovery of the solvent from the coating solutions is simplified.

2. DESCRIPTION OF THE PRIOR ART

It has been known for some time that textiles (for example woven and knitted fabrics or nonwovens) may be coated with solutions of polyester and/or polyether urethanes by the reverse coating process. The articles obtained are used in the manufacture of outer clothing, upholstery, suitcase material, shoe upper materials and the like. The manufacture of shoe upper materials is of particular commercial significance.

A typical reverse coating process is carried out for example as follows:

In a coating machine, the surface coat solution (A) is doctor-coated onto a release paper, for example by means of doctor rolls, the spread amounting for example to 120 g/m² of solution. After passage through a drying tunnel, which has an air temperature in the range from 80° to 100° C. at its entrance and in the range from 120° to 140° C. at its exit, the adhesive-coat solution (B) is similarly applied in a second coating machine, for example in a spread of 120 g/m², after which the web-formed textile, for example a raised cotton-duvetine fabric weighing 240 g per square meter, is laminated onto the solvent-moist adhesive coat and the solvent mixture of the adhesive coat evaporated in the drying tunnel. On leaving the drying tunnel, the release paper is rolled up separately from the coated fabric web (artificial leather). This general version of reverse coating onto release paper can involve considerable difficulties which make it impossible to manufacture commercially satisfactory, coated textile webs.

The so-called "frostwork effect" can occur when the adhesive-coat solution (B), which may be both a one-component or two-component polyurethane and/or a high-solids polyurethane reactive mixture, is applied onto the dry, approximately 0.03 to 0.05 mm thick surface coat.

This figurative expression describes the following phenomenon. If the solvent mixture of the adhesive coat (B) is a poor solvent for the polyurethane of the surface coat (A), the surface coat (A) is not dissolved, but merely swollen. The effect of this swelling is that the surface coat film is lifted off the release paper at numerous points of the web, but still adheres to the web at other points. This swelling phenomenon, beginning at several points, spreads over the entire surface in a matter of seconds like freezing frostwork on a cold window and makes the coating unsuitable for further processing.

To avoid this effect, solvents which not only swell but also dissolve the surface coat have hitherto been used in the adhesive coat.

However, if the dissolving power of the adhesive coat solution is too great for the surface coat, the phenomenon of so-called "overlamination" is observed. The already dry surface coat is dissolved by the solvent (mixture) of the adhesive coat to such an extent that the web-form textile laminated onto the adhesive coat is forced through both polyurethane layers so that the textile structure, for example the pile, becomes visible on the upper side of the coating. This is inevitably accompanied by a marked deterioration in the physical strength values of the coatings, for example their resistance to bending and their resistance to abrasion.

Previous experience has shown that an adhesive coat solution always has an excessive dissolving power on the surface coat if it contains a high percentage of, or even exclusively, highly polar solvents, such as dimethyl formamide or dimethyl acetamide, in the solvent mixture.

In the field of pollution control, the burning or recovery of organic solvents from industrial processes, including for example the coating of textiles with polyurethane solutions, is becoming an acute industrial problem. The ecologically necessary recovery of solvents from textile coating processes can only be carried out rationally and economically when, contrary to the existing state of the art, the polyurethane solutions contain a single solvent rather than solvent mixtures, such as dimethyl formamide/methyl ethyl ketone, dimethyl formamide/methyl ethyl ketone/toluene, toluene/isopropanol and other mixtures. For reasons associated with the solubility of polyurethanes, the only solvents suitable for this purpose are highly polar solvents, such as dimethyl formamide, dimethyl acetamide, monomethyl formamide, monomethyl acetamide, N-methyl pyrrolidone and, in exceptional cases, less polar solvents, such as tetrahydrofuran or methyl ethyl ketone. In this connection, particular significance is attributed to dimethyl formamide by virtue of its dissolving power and its commercial availability.

Accordingly, there is a need to find a process where only one solvent, preferably dimethyl formamide, is used for coating without the coating process being accompanied by the adverse side effects mentioned above, such as the frostwork effect and overlamination.

Although it is known that, to reduce the effect of dimethyl formamide adhesive-coat solutions on surface coats already applied (dried on) to release paper, measured quantities of water may be added to the adhesive-coat solution (DE-OS No. 24 31 846), this reduces the solubility of the adhesive-coat polyurethanes in such a way that the solids concentration of the adhesive coat has to be kept relatively low.

SUMMARY OF THE INVENTION

Accordingly, the present invention relates to a process for the multiple-coat reverse coating of textile (preferably web-form) substrates for producing artificial leather from at least one surface-coat solution and at least one adhesive-coat solution based on polyurethanes, characterized in that (A) the surface coats used are aromatic or aliphatic one-component or two-component polyurethanes which are synthesized using chain-extending agents based on low molecular weight diols melting at temperatures above 100° C. and corresponding to formulae (I) to (VI) below

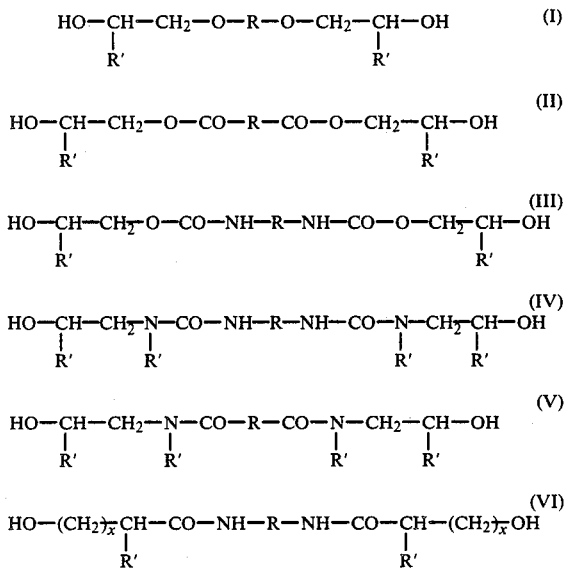

in which

R represents $C_2$-$C_{20}$ and preferably $C_2$-$C_{15}$ alkylene, cycloalkylene or arylene radicals, R' represents H, $CH_3$ and x is an integer of from 0 to 5, (B) the adhesive coats used are aromatic or aliphatic one-component polyurethanes different from (A), two-component polyurethanes and/or high-solids PU-reactive mixtures which have a solids concentration of more than about 40% by weight (preferably more than about 50% by weight) and (C) the solvent used for (A) and (B) is one and the same polar solvent selected from the group consisting of dimethyl formamide, dimethyl acetamide, N-methyl pyrrolidone, tetrahydrofuran and methyl ethyl ketone, preferably dimethyl formamide.

DETAILED DESCRIPTION OF THE INVENTION

Although the use of polyurethanes for coating is not basically new, the invention per se and the technical advance which it represents lie in the specific choice of polyurethanes for the surface coat and in the combination with the highly concentrated polyurethanes for the adhesive coat, which overall provides for the use of dimethyl formamide or a similar polar solvent as the sole solvent.

The surface coats (A) which may be used are aromatic or aliphatic one-component polyurethanes which have been synthesized using chain-extending agents based on low molecular weight diols melting at temperatures above 100° C. and corresponding to formulae (I) to (VI). To this end, relatively high molecular weight difunctional or polyfunctional polyhydroxyl compounds (preferably having molecular weights of from about 500 to 6000), optionally in conjunction with low molecular weight polyols, such as butane diol or trimethylol propane, are generally converted with excess quantities of diisocyanates into NCO-prepolymers and the NCO-prepolymers thus obtained are reacted with the high-melting chain-extending agents (I) to (VI) in substantially equivalent quantities (two-stage process) or alternatively the relatively high molecular weight polyhydroxyl compounds are directly converted in a single stage into the high molecular weight polyurethane by combination with the low molecular weight polyols, which consist predominantly of the relatively high melting polyols of formulae (I) to (VI), and reaction with substantially equivalent quantities of diisocyanates (one-stage process). When aromatic diisocyanates are used, the polyurethanes obtained are referred to as aromatic polyurethanes and, when aliphatic diisocyanates are used, as aliphatic polyurethanes. The polyurethanes are soluble in solvents as such (i.e. in high molecular weight form) and when substantially difunctional reaction components are used. They may be prepared in the melt, in reaction extruders or even directly in solution.

If not enough NCO-equivalents or chain terminators are used in the synthesis of the polyurethanes, the polyurethanes formed contain terminal OH-groups and do not have such high molecular weights and are subsequently crosslinked by the addition of polyisocyanates or even other crosslinking agents, for example formaldehyde resins, optionally in the presence of catalysts (so-called two-component polyurethanes).

The adhesive coats (B) may be one-component polyurethanes or two-component polyurethanes which are crosslinked with formaldehyde resins, preferably with formaldehyde-urea and/or melamine resins and/or polyisocyanates, optionally in blocked form (blocked polyisocyanates). The polyurethanes are preferably synthesized from relatively high molecular weight polyhydroxyl compounds, optionally low molecular weight polyols, aliphatic or aromatic polyisocyanates and diols or diamines, for example isophorone diamine, as chain-extending agents. Polyurethanes for (B) are preferably synthesized from relatively high molecular weight polyhydroxyl compounds, 0 to 3.0 moles of diol chain-extending agents, preferably alkylene diols, which may also contain relatively small quantities of triols, and substantially equivalent quantities of diisocyanates. However, so-called high-solids polyurethanes of the type described in DE-OS No. 29 02 090 may also be used for the adhesive-coat solutions according to the invention. The high-solids polyurethanes in question are preferably ketoxime-blocked NCO-prepolymers with NCO-contents of from about 0.5 to 3.0% NCO, preferably from about 0.5 to 2% NCO, based on relatively high molecular weight polyhydroxyl compounds, optionally 0 to 1 mole of low molecular polyols and excess quantities of aromatic diisocyanates which are crosslinked in the form of highly concentrated solutions in the corresponding solvent, preferably dimethyl formamide, with aromatic or preferably aliphatic polyamines. The polyamines used are preferably substantially involatile aliphatic and, more particularly, cycloaliphatic diamines, for example 3,3'-dimethyl-4,4'-diaminodicyclohexylmethane.

The polyurethanes (A) an (B) are prepared in known manner, for example in the melt or in solution, using both the one-shot process and also the prepolymer process.

Suitable relatively high molecular weight polyhydroxyl compounds are, in particular, dihydroxypolyesters and/or dihydroxypolyethers having molecular weights of from about 600 to 4000. The diisocyanates used are preferably tolylene diisocyanates, diphenylmethane diisocyanates and isophorone diisocyanate or dicyclohexylmethane-4,4'-diisocyanate. Examples of suitable relatively high molecular weight polyhydroxyl compounds and diisocyanates may be found on pages 8 to 10 of DE-OS No. 24 31 846 or in U.S. Pat. No. 4,248,910, herein incorporated by reference.

The following may be used as diols corresponding to formulae (I) to (VI) melting at temperatures above 100° C. 1,4-phenylene-bis-($\beta$-hydroxyethylether), 4,4'-biphenylene-bis-($\beta$-hydroxyethylether), 4,4'- diphenylmethane-bis-($\beta$-hydroxyethylether), 4,4'-benzophenon-bis-($\beta$hydroxypropylether), terephthalic acid-bis($\beta$-hydroxyethylester, tetrachloroterephthalic acid-bis-($\beta$-hydroxypropylester), diphenylether-4,4'-dicarboxylic acid-bis-($\beta$-hydroxyethylester), 1,5-naphthalene dicarboxylic acid-bis-(2-hydroxypropylester), 1,2-ethylene-bis-($\beta$-hydroxyethylurethane), 4,4'-diphenylmethane-bis-($\beta$-hydroxyethylurethane), 1,4-cyclohexane-bis-($\beta$hydroxyethylurethane), 4,4'-dicyclohexylmethane-bis-($\beta$hydroxypropylurethane), 2,6-tolyene-bis-($\beta$-hydroxylurethane), 1,5-naphthalene-bis-($\beta$-hydroxyethylurethane), 1,6-hexamethylene-bis-($\beta$-hydroxyethylurea), 4,4'-diphenylmethane-bis-($\beta$-hydroxypropylurea), 2,4- and 2,6-tolylene-bis-($\beta$-hydroxyethylurea), isophorone-bis-($\beta$-hydroxyethylurea), 4,4'-dicyclohexylmethane-bis-($\gamma$-propylurea), terephthalic acid-bis-($\beta$-hydroxyethyl-N-methylamide), 1,4-cyclohexane dicarboxylic acid-bis-($\beta$-hydroxyethylamide), isophthalic acid-bis-($\gamma$-hydroxypropylamide), 1,4-phenylene-bis-propionic acid-bis-($\beta$-hydroxy-N-ethylamide), hydrazodicarboxylic acid-bis-$\beta$-hydroxypropylamide), 1,6-hexamethylene-bis-($\alpha$-hydroxy-propionic-acid-amide), 1,4-cyclohexane-bis-($\delta$-hydroxybutyric-acid-amide), 3,3'-dimethyldicyclohexylmethane-4,4'-bis-($\epsilon$-hydroxycaproic-acid-amide), 1,3-phenylene-bis-($\alpha$-hydroxypropionic-acid-amide).

Some of the diols (I) to (VI) are described in German Offenlegungsschrift Nos. 24 31 846 and 15 44 864.

In addition to the diols of formulae (I) to (VI) melting at temperatures above 100° C., diols, such as ethylene glycol, 1,3-propane diol and 1,2-propane diol, 1,4-, 1,3- and 2,3-butane diol, 1,5-pentane diol, 2,2-dimethyl-1,3-propane diol, 1,6-hexane diol, ether diols, such as diethylene glycol, triethylene glycol, or amine diols, such as N-methyldiethanolamine, N-methyldipropanolamine or others, may be used in smaller quantities as chain-extending agents.

The adhesive-coat polyurethanes or, optionally, the surface-coat polyurethanes may be cross-linked linked with formaldehyde resins, such as formaldehyde-urea or formaldehyde-melamine resins, methylol-containing monomers, such as melamine hexamethylolether, or copolymers containing N-methylolacrylamide, for example, as comonomer, which are used under the catalytic effect of acid-reacting substances, for example maleic acid, phosphoric acid, 4-toluene sulfonic acid, optionally in conjunction with bases, such as ammonia, N-methylmorpholine, triethanolamine, for buffering. Further examples are polyepoxides, polyaziridines or polyisocyanates, i.e. di-, tri- and poly-functional polyisocyanates, optionally in blocked form with phenol, caprolactam or ketoximes, for example, as the blocking group.

Suitable solvents for the surface coat and the adhesive coat are polar solvents, such as dimethyl formamide, dimethylacetamide, monomethyl formamide, monomethylacetamide, N-methylpyrrolidone, although tetrahydrofuran and methylethylketone may also be used. Dimethylformamide is particularly preferred.

In addition, pigments, fillers and other additives, such as hydrolysis stabilizers, dyes, UV-stabilizers, oxidation inhibitors, handle-improving agents, polysiloxanes and other standard additives, may be added to the surface-coat and adhesive-coat solutions in the usual way and in the usual quantities.

The following Examples describe the problem-free lamination (i.e. without the so-called frostwork effect and without overlamination) of the polyurethane surface coats (A) containing the chain-extending agents of formulae (I) to (VI) with the highly concentrated adhesive-coat solutions (B) containing only one and the same solvent.

The invention is further illustrated, but is not intended to be limited by the following examples in which all parts and percentages are by weight unless otherwise specified.

EXAMPLES

General Procedure for Coating

In a coating machine, the surface-coat solution (A) was applied to a release paper by means of a doctor roll, the spread amounting to between 100 and 150 g/m$^2$ of solution. After passage through the drying tunnel, which had an air temperature of 100° C. at its entrance and one of 140° C. at its exit, the adhesive-coat solution (B) was similarly applied in the second coating machine (spread 50 to 150 g/m$^2$), the textile web, a raised cotton-duvetine fabric weighing 240 g per square meter, was laminated on, the solvent in the adhesive coat was evaporated in the drying tunnel and crosslinking optionally induced at elevated temperature (for example 150° to 160° C.). On leaving the drying tunnel, the release paper and the coated fabric web were rolled up separately from one another.

EXAMPLE 1

The surface-coat solution (A) 1 was a 25% solution of a polyester polyurethane in dimethyl formamide (DMF) with a viscosity of 8000 mPa.s/25° C.

The polyurethane was obtained by the melt condensation of 1000 g (0.45 mole) of a 1,4-butane diol/adipic acid polyester, 150 g (0.76 mole) of 1,4-phenylene-bis-hydroxyethylether (Mp 105° C.) and 305 g (1.22 moles) of 4,4'-diphenylmethane diisocyanate. nate.

The surface coat solution A/V-1 (Comparison) was a 25% solution of a polyester polyurethane in DMF with a viscosity of 9000 mPa.s/25° C. The polyurethane was obtained by the melt condensation of 1000 g (0.45 mole) of a 1,4-butane diol/adipic acid polyester, 69 g (0.76 mole) of 1,4-butane diol and 305 g (1.22 mole) of 4,4'-diphenylmethane diisocyanate.

The surface-coat solution A/V-2 (Comparison) was a 25% solution of a polyester polyurethane in DMF with a viscosity of 8700 mPa.s/25° C. The polyurethane was obtained by the melt condensation of 1000 g (0.45 mole) of a 1,4-butane diol/adipic acid polyester, 181 g of 1,4-butane diol (2.02 moles) and 620 g (2.46 moles) of 4,4'-diphenylmethane diisocyanate.

The adhesive-coat solution (B) 1 was a 50% solution of a polyester polyurethane in DMF with a viscosity of 45,000 mPa.s/25° C. The polyurethane was also obtained by melt condensation.

1000 g (0.45 mole) of a 1,4-butane diol/adipic acid polyester, 89 g (0.99 mole) of 1,4-butane diol and 360 g (1.44 moles) of 4,4'-diphenylmethane diisocyanate were reacted in a reaction extruder and subsequently granulated.

The adhesive-coat solution B/V-1 (Comparison) was a 30% solution of a polyester polyurethane in DMF with a viscosity of 20,000 mPa.s/25 ° C. The polyurethane was obtained in the same way as adhesive-coat solution (B) 1 by subjecting the components to melt condensation.

The coatings obtained by the general coating procedure (using the transfer process) may be compared as follows in regard to the quality of lamination:

| Transfer Coatings | Condition of the Coating |
| --- | --- |
| A)1/B)1 (according to the invention | not overlaminated |
| A/V-1/B)1 (Comparison) | heavily overlaminated |
| A/V-2/B)1 (Comparison) | overlaminated |
| A)1/B/V-1 (Comparison) | heavily overlaminated |

EXAMPLE 2

The surface-coat solution (A) 2 was a 30% solution of a polyester polyurethane in DMF with a viscosity of 18,000 mPa.s at 25° C. The polyurethane was obtained by the solution polyaddition of 1000 g (0.50 mole) of a mixed polyester of 1,6-hexane diol, neopentyl glycol and adipic acid (molar ratio of the glycols 65:35) with 279 g (1.10 mole) of terephthalic acid-bis-$\beta$-hydroxyethylester) (Mp 109° C.) and 400 g (1.60 moles) of 4,4'-diphenylmethane diisocyanate at 70° to 80° C.

The adhesive-coat solution (B)2 was a 52% solution in DMF with a viscosity of approximately 25,000 mPa.s at 25° C. It consisted of 1000 g of a 50% PUR-solution in DMF, 40.0 g of a commercially available formaldehyde-melamine resin (melamine hexamethylether), 10.0 g of a DMF-solution of 2.0 g of toluene sulfonic acid and 1.6 g of triethanolamine (crosslinking catalyst).

The 50% PUR-solution itself was obtained by polyaddition in DMF: 1000 g of diethylene glycol/adipic acid polyester (0.50 mole), 80.0 g (0.75 mole) of diethylene glycol and 218.0 g (1.25 moles) of tolylene-2,4-/2,6-diisocyanate (80:20 isomer mixture) were reacted with one another at 70° to 80° C.

The coating of (A)2/(B)2 (a shoe upper material), had a satisfactory, impervious surface with no sign of overlamination. The surface coat (A) 2 was resistant to the effect of the DMF in the adhesive coat (B)2 under the coating conditions and showed no sign of the so-called frostwork effect when combined with the adhesive-coat solution.

EXAMPLE 3

The surface-coat solution (A)3 was a 35% solution of a polyether polyurethane in DMF with a viscosity of 27,000 mPa.s at 25° C. The polyurethane was produced by polyaddition in solution.

1000 g (0.50 mole) of a dihydroxy oxytetramethylene polyether, 467 g (1.25 moles) of 4,4'-diphenylmethane-bis-($\beta$hydroxyethylurethane) (Mp: 140° C.) and 438 g (1.75 moles) of 4,4'-diphenylmethane diisocyanate were subjected to polyaddition in solution at 60° to 70° C.

The adhesive-coat solution (B)3 was a 72% solution of a two-component polyurethane in DMF with a viscosity of 38,000 mPa.s at 25° C. The solution consisted of 1000 g of a 70% PUR-solution in DMF and 70 g of a polyisocyanate of tripropylene glycol (1.0 mole) and 4,4'-diphenylmethane diisocyanate (5.0 moles) with an NCO-content of approximately 20% as crosslinking agent.

The 70% PUR-solution itself was obtained by polyaddition in DMF.

1000 g (0.5 mole) of dihydroxy oxypropylene polyether, 54.0 g (0.60 mole) of 1,4-butane diol and 191 g (1.1 mole) of tolylene-2,4/2, 6-diisocyanate (80:20 isomer mixture) were reacted at 80° to 90° C.

The shoe upper material produced by the transfer process from (A)3 and (B)3 was satisfactorily laminated, i.e. did not show any sign of overlamination.

EXAMPLE 4

The surface coat solution (A)4 was a 30% solution of a polyester polyurethane in DMF, viscosity 18,500 mPa.s/25° C. The polyurethane was obtained by the polyaddition in solution of 1000 g (0.50 mole) of diethylene glycol/adipic acid polyester, 450 g (1.20 moles) of 4,4'-diphenylmethane-bis-($\beta$-hydroxyethylurethane) (Mp: 140° C.) and 425 g (1.70 moles) of 4,4'-diphenylmethane diisocyanate.

Shoe upper material was produced from (A)4 and (B)1 by the transfer process. The coating did not show any sign of overlamination. The surface coat (A)4 was resistant to the effect of the DMF in the adhesive coat (B)1 under the coating conditions.

EXAMPLE 5

The surface-coat solution (A)5 was a 30% solution of a polyester polyurethane in DMF with a viscosity at 25° C. of 20,000 mPa.s/25° C. The polyurethane was obtained by the polyaddition in solution at 70° to 80° C. of 1000 g of a polycaprolactone diol (0.5 mole), 160 g (0.40 mole) of 4,4'-diphenylmethane-bis-($\gamma$-hydroxypropyl)-urea (Mp: 230° C.) and 225 g (0.90 mole) of 4,4'-diphenylmethane diisocyanate.

The adhesive coat solution (B)5 was a 42% solution in DMF with a viscosity of 12,000 mPa.s/25° C. The solution consisted of 1000 g of a 40% PUR-solution in DMF and 40 g of a polyisocyanate of tripropylene glycol (1.0 mole) and 4,4'-diphenylmethane diisocyanate (5.0 moles) with an NCO-content of approximately 20% and 10.0 g of another polyisocyanate obtained by biuretizing 1,6-hexane diisocyanate and having an NCO-content of approximately 20%.

The 40% PUR-solution itself was obtained by the polyaddition in solution at 70° to 80° C. of 1000 g (0.50 mole) of a mixed polyester of 1,6-hexane diol, neopentyl glycol (molar ratio of diols 65:35) and adipic acid, 54 g (0.60 mole) of 1,3-butane diol and 191 g (1.10 moles) of tolylene-2,4/2,6-diisocyanate (65:35 isomer mixture). The surface coat (A)5 was distinguished by its excellent lamination strength.

EXAMPLE 6

The surface-coat solution (A)6 was a 25% solution of a polycarbonate polyurethane in DMF with a viscosity of 11,500 mPa.s at 25° C. The PUR-solution was obtained by polyaddition in DMF-solution.

1000 g (0.50 mole) of a dihydroxypolycarbonate (obtained from 1,6-hexane diol and diphenyl carbonate) were reacted with 222 g (1.0 mole) of isophorone diisocyanate in the melt at 110° to 120° C. This NCO-prepolymer was dissolved in 4086 g of DMF. Following the addition of 140 g (0.50 mole) of terephthalic acid-bis-(ω-hydroxypropylamide) (Mp: 202° C.), the polyaddition reaction was continued at 80° C.

After dissolution in 4086 g of DMF, the NCO-prepolymer was similarly polyadded at 80° C. with 140 g (0.50 mole) of terephthalic acid-bis-β-hydroxyethyl-N-methylamide) (Mp: 175° C.).

The adhesive-coat solution (B)6 was an 86% preparation of a blocked high-solids NCO-prepolymer in DMF with a viscosity of 50,000 mPa.s at 25° C.

1000 g of blocked NCO-prepolymer, 50 g of a highly disperse silica and 65.0 g of 3,3'-dimethyl-4,4'-diaminodicyclohexylmethane were mixed.

The blocked NCO-prepolymer (85% in DMF) was obtained by reacting 1250 g (0.50 mole) of diethylene glycol/adipic acid polyester with 174 g (1.0 mole) of tolylene-2,4/2,6-diisocyanate (80:20 isomer mixture) in the melt at 100° C. After the required NCO-content had been reached, the reaction was continued for 30 minutes at 80° C. with 90.0 g of butanone oxime (1.04 moles), followed finally by the addition of 265 g of DMF. The blocked NCO-prepolymer had an NCO-content of 2.35%.

The surface coats of solutions according to Example 6 were readily bonded to the adhesive coat (B)6 without any lamination problems,

EXAMPLE 7

The surface-coat solution (A)7 is a 30% solution of a polyether polyurethane in DMF with a viscosity of 20,000 mPa.s/25° C. The PUR-solution was obtained by polyaddition in DMF.

2000 g (1.0 mole) of dihydroxy propylene polyether were reacted in the melt at 110°-120° C. with 262 g (1.0 mole) of 4,4'-dicyclohexylmethane diisocyanate and 202 g (1.20 mole) of 1,6-hexane diisocyanate to form an NCO-prepolymer. The NCO-prepolymer thus formed was dissolved in 6500 g of DMF. After the addition of 330 g (1.15 mole) of 1,4-cyclohexane-bis-(δ-hydroxybutyric acid amide) (Mp: 280° C.), the polyaddition reaction was continued at 80° C. until the required viscosity was reached.

The adhesive-coat solution (B)7 was an approximately 95% preparation of a blocked high-solids NCO-prepolymer in DMF with a viscosity of 35,000 mPa.s/25° C.

1000 g of blocked NCO-prepolymer, 20 g of a highly disperse silica and 58.0 g of 4,4'-diaminodicyclohexylmethane were stirred to form a ready-to-use adhesive-coat paste.

The blocked NCO-prepolymer (95% in DMF) was prepared as follows.

2000 g (0.50 mole) of a polyhydroxyoxypropylene polyether in admixture with 125 g (0.22 mole) of a dihydroxyoxypropylene polyether (of 4,4'-dihydroxydiphenyldimethylmethane and propylene oxide) were reacted in the melt at 100° C. with 187.5 g (0.75 mole) of 4,4'-diphenylmethane diisocyanate and 130 g (0.75 mole) of tolylene-2,4/2,6-diisocyanate (80:20 isomer mixture) to form an NCO-prepolymer. The terminal NCO-groups remaining were blocked at 80° C. with 140 g (1.60 moles) of butanone oxime and the melt is dissolved in 136 g of DMF. The blocked NCO-prepolymer had an NCO-content of approximately 2.3%.

The surface coat of the aliphatic one-component PUR according to (A)7 was readily laminated with textile substrates using the DMF-containing adhesive coat paste (A)7 without any effect on the surface coat.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the multiple-coat reverse coating of textile substrates for producing artificial leather from at least one surface-coat solution and at least one adhesive-coat solution based on polyurethanes, characterized in that (A) the surface coat is an aromatic or aliphatic one-component or two-component polyurethane which has been synthesized using an isocyanate-reactive component comprising at least one high molecular weight polyol and a chain-extending agent based on at lease one low molecular weight diol melting at temperatures above 100° C. and corresponding to formula (I) to (VI) below

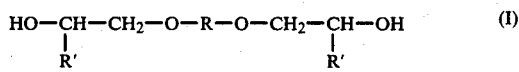

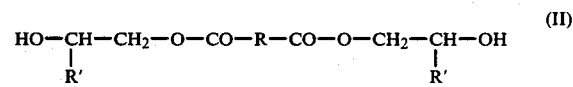

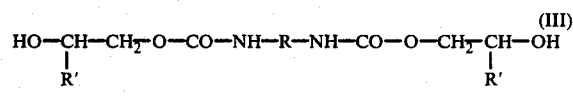

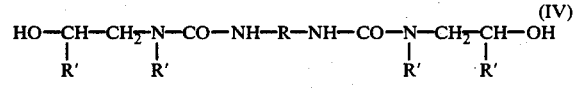

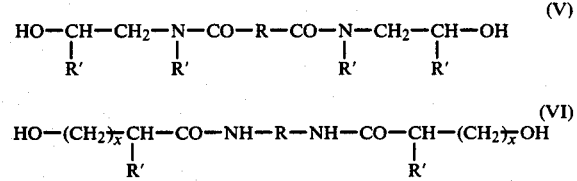

in which
R represents $C_2$-$C_{20}$ alkkylene, cycloalkylene or arylene radicals,
R' represents H, $CH_3$ and
x is an integer of from 0 to 5, (B) the adhesive-coat is an aromatic or aliphatic one-component or two-component polyurethane different from (A) and/or a high-solids PU-reactive mixture which has a solids concentration of more than 40% by weight, and (C) the solvent used for (A) and (B) is one and the same polar solvent selected from the group consisting of dimethyl formamide, dimethyl acetamide, N-methyl pyrrolidone and tetrahydrofuran.

2. The process as claimed in claim 1, characterized in that the surface-coat polyurethane (A) contains a chain-extending diol corresponding to formulae (I) to (VI) and melting at temperatures above 100° C. in quantities of from about 0.5 to 3.0 moles per mole of high molecular weight polyol.

3. The process as claimed in claim 1, characterized in that the adhesive coat (B) has a solids concentration of more than about 50% by weight.

4. The process as claimed in claim 1, characterized in that 1,4-phenylene-bis-hydroxyethylether, terephthalic acid-bis-(β-hydroxyethylester) or 4,4'-diphenylmethane-bis-(β-hydroxyethylurethane) is used as the chain-extending diol for the surface-coat polyurethane.

5. The process as claimed in claim 2, characterized in that 1,4-phenylene-bis-hydroxyethylether, terephthalic acid-bis-(β-hydroxyethylester) or 4,4'-diphenylmethane-bis-(β-hydroxyethylurethane) is used as the chain-extending diol for the surface-coat polyurethane.

6. The process as claimed in claim 1, characterized in that dimethyl formamide is used as the polar solvent for the surface and adhesive coats.

7. The process as claimed in claim 2, characterized in that dimethyl formamide is used as the polar solvent for the surface and adhesive coats.

8. The process as claimed in claim 4, characterized in that dimethyl formamide is used as the polar solvent for the surface and adhesive coats.

9. The process as claimed in claim 5, characterized in that dimethyl formamide is used as the polar solvent for the surface and adhesive coats.

10. The process as claimed in claim 1 wherein the adhesive-coat (B) is based on
(a) a high molecular weight polyol,
(b) from 0 to 3 moles, based on the moles of (a), of alkylene diols and/or triols as chain extenders and
(c) substantially equivalent quantities of diisocyanates.

11. The process as claimed in claim 1 wherein the adhesive-coat (B) is cross-linked with blocked or unblocked polyisocyanates.

12. The process as claimed in claim 1 wherein the adhesive-coat (B) is cross-linked with formaldehyde-urea and/or formaldehyde-melamine resins.

13. The process as claimed in claim 1 wherein the adhesive-coat (B) is cross-linked with mixtures of blocked polyisocyanates and formaldehyde-urea and/or formaldehyde-melamine resins.

14. The process as claimed in claim 1 wherein the adhesive-coat (B) is produced from 0.5 to 3% by weight of NCO-prepolymers containing NCO-groups blocked with butanone oxime and substantially equivalent quantities of cycloaliphatic polyamines and is crosslinked with mixtures of blocked aromatic polyisocyanates and formaldehyde-melamine resins.

15. The process as claimed in claim 9 wherein the adhesive-coat (B) is produced from 0.5 to 3% by weight of NCO-preolymers containing NCO-groups blocked with butanone oxime and substantially equivalent quantities of cycloaliphatic polyamines and is crosslinked with mixtures of blocked aromatic polyisocyanates and formaldehyde-melamine resins.

* * * * *